March 18, 1930.  S. RUBEN  1,751,362
ELECTRIC CURRENT RECTIFIER
Filed June 17, 1926

INVENTOR.
Samuel Ruben
BY
Mayer, Warfield Watson
ATTORNEYS.

Patented Mar. 18, 1930

1,751,362

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC-CURRENT RECTIFIER

Application filed June 17, 1926. Serial No. 116,598.

This invention relates to electric current rectifiers and the like which employ asymmetric couples of the dry surface—contact variety.

Rectifiers of this type are characterized by the use of a body of relatively electropositive material, employed as one electrode element, disposed in electrical contact with a body of relatively electronegative material employed as the other electrode element. Such rectifiers depend for their operation upon the resistance and inverse current-blocking characteristics of the film which forms at this junction as the result of electrochemical action. Rectifiers of this character, known to the prior art, have been low in efficiency and limited in their application to small currents, becoming inoperative after short periods of use.

The present invention has for its object generally to provide an improved device of the character described, which is efficient, economical and readily manufactured, and which may also be given in advance a superior rectifying characteristic.

More specifically an object is to provide a means for enabling the electronegative electrode element to be operated at a substantially maximum efficiency, and also for maintaining an optimum operating temperature.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Figure 1:
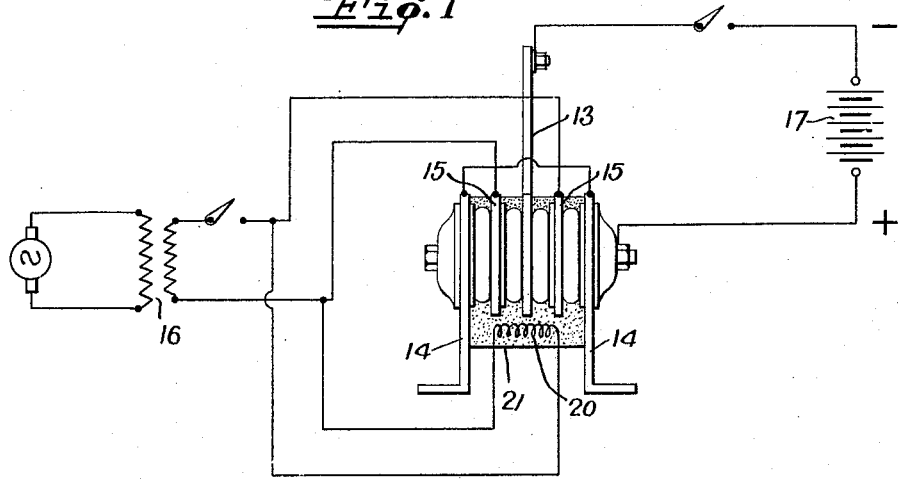
Figure 2:
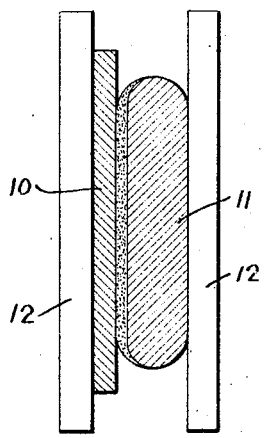

For a fuller understanding of the nature and objects of the invention, reference should be had to the following detailed description taken in connection with the accompanying drawing, in which:

Fig. 1 shows diagrammatically a rectifying unit, arranged for battery charging service, constructed in accordance with the present invention; and Fig. 2 is an enlarged cross-section of the cooperating electrode elements when constructed in accordance with the present invention.

Referring now to the drawing and particularly to Fig. 2, 10 denotes an electropositive electrode element against which is disposed an electronegative electrode element 11. These elements thus arranged comprise an asymmetric couple, and preferably are placed between conducting terminal electrodes, or end-plates, as shown at 12, through which circuit connections are preferably made. A rectifying unit is made by operatively assemblying one or more asymmetric couples, for example, as shown in Fig. 1. Here a rectifying unit is illustrated as comprising two groups of two couples each, the groups being inverted with respect to each other and disposed adjacent the central electrode plate 13. The end electrodes of the rectifying unit here shown comprise conducting standards 14.

The rectifying unit thus arranged is adapted to have the intermediate terminal plates, shown at 15, arranged to function as the alternating current input electrodes. These terminal plates, in consequence, are shown as connected across the secondary of the transformer 16. This transformer is indicated as a step-down transformer, as the rectifying unit here shown is essentially a low voltage device; a step-down transformer is consequently preferably employed in order that a commercial source of alternating current may be utilized, for example, an ordinary 60 cycle 110-volt A. C. supply.

By the arrangement shown, the terminal plates 14 are of the same polarity and serve as one terminal for the direct current circuit. The mid-terminal 13 has an opposite polarity and serves as the other terminal of the direct current circuit. These electrodes are shown as connected respectively to the positive and negative terminals of a battery 17, which is arranged to be charged.

In the practice of the present invention, the contact resistance at the junction between the electropositive and electronegative electrode elements respectively, is increased materially above that normally attendant the placing together of electropositive and electronegative electrode elements chosen normally to be relatively widely divergent in the electro-chemical series, and of a composition taught in my copending applications, Serial No. 51,524 filed August 20, 1925, and Serial No. 69,215 filed November 16, 1925. In these applications there is disclosed an electro-positive electrode element chosen from the lighter metals of the second and third periodic groups which include aluminum, borium, magnesium, calcium and zinc and an electro-negative electrode element which is a metallic compound with an element chosen from the oxygen family in the sixth periodic group. Suitable metals which compound with these elements are iron, vanadium, manganese, tin, lead, antimony, zinc and copper or an alloy thereof. As an example of a suitable couple, may be mentioned one having the electropositive electrode element of magnesium, and the electronegative electrode element of a selenide of an alloy of copper. It has been ascertained, however, that by increasing the surface contact resistance, a relatively great drop in potential occurs right at the surface, with a corresponding expenditure of energy, as a result of the resistance losses incident to the passage of current. This energy is utilized electro-chemically in the formation of the inverse current-blocking film which gives the phenomenon of unilateral conductivity, and hence of rectification. The more intense and localized this contact resistance can be made, the more efficient is the rectifying action produced in this manner. This is accomplished by distributing resistance material over the surface of the electrode element which has a higher specific resistance than that characteristic of the electrode material.

The materials preferred for electronegative electrode elements in rectifiers of this character are metallic compounds of the sixth periodic group; for example, sulphides, selenides and tellurides which have a copper base, and for some purposes, also oxides. The specific resistance of oxides however is the highest of the class, (the resistance of the compounds decreasing with the increase in the atomic numbers) and while not in general preferred as the componds for ordinary rectifying service, still may be used on electrode elements which are compounds of the other elements of the sixth group, in order that they may have their efficiency increased, in accordance with the practice of the present invention; that is, by providing the electronegative electrode element with a layer of oxide material disposed substantially uniformly over the surface adapted to contact with the electropositive electrode element, its efficiency is increased.

It has been observed that, during the process of rectification, there is an intense electrostatic field over the surface of the contacting electrode elements, as pointed out in my prior application, Serial No. 38,780 filed June 22, 1925. In consequence, the electrode elements are required to be under relatively high pressure in order to prevent their chattering, or otherwise destroying the rectifying film. The electrode elements, in consequence, should be mechanically strong in order to avoid mechanical disintegration from this cause. An oxide layer on the electronegative electrode element, arranged as an integral part of the same, is therefore preferable, since it is not likely thereby to be displaced during the rectifying action.

In the preferred form of the present invention, electronegative electrode elements have a high resistance integral crystalline coating in the form of a conducting oxide of a metallic base produced by a thermal or electrolytic process. Such coating is formed by any reaction involving a conversion of a relatively thin surface layer of the original material of the electronegative electrode element into an oxide.

There are several practical methods by which a reaction of this character may be produced, as follows:

*Method I.*—A disk of electronegative material having a copper base, for example, a disk of cupric selenide is provided electrolytically with an oxide layer, by placing it in contact with a conducting disk of electropositive material, for example, one of magnesium that has been first sprayed with water; the electronegative disk is then connected to the negative terminal of a relatively constant source of low voltage direct current, for example, an 8-volt storage battery; the electropositive disk is at the same time connected to the positive terminal. When current is passed, a surface layer of cuprous oxide is produced, the current being continued until a layer of desired density and thickness is obtained.

*Method II.*—The oxide coating may also be produced electrolytically by taking the electronegative electrode disk, such as one of cupric selenide, and suspending it in an electrolytic bath, for example, a bath of nitric acid; in order that this disk may be coated with oxide, it is connected as an anode in a direct current circuit; a current of relatively high density is then passed through the solution, the solution itself being at the same time preferably heated.

*Method III.*—A third method for producing layers of this character may be practiced in the following manner: The electronegative electrode element is first suspended in a solution of bicromate of potash; sufficient heat is then applied to boil the same. A substantially uniform coating of cuprous oxide of desired thickness and density results with sufficient boiling. In this instance, no electric current is utilized.

*Method IV.*—Another method which may be practiced is as follows: An electronegative electrode disk having a copper base and a relatively small resistance is connected to one terminal of a low voltage source of alternating current, for example, to a terminal on the low voltage side of a transformer; the other terminal of this source is then connected to an electrode of electropositive material, preferably in rod-form, for example, a rod of magnesium; an arc is then struck and played between the disk and the rod; the arc thus established is continuously moved about the surface of the disk so that a relatively complete surface reaction will occur which converts a layer of the exposed surface into a desired cuprous oxide coating after a short period of time.

*Method V.*—Still another method may be practiced which depends upon a thermal reaction for producing a surface oxide of the character described; an electronegative electrode element is first heated to its kindling temperature, for example, one of about 1000° C. for a cupric selenide element; air (preferably dried) is then passed over the heated surface until a desired oxide coating has formed.

The electronegative electrode element which is to be thus coated with oxide, should be as dense and homogeneous as it is practical to make it. A hard, dense, homogeneous disk, it has been found, however, is best made by fusing together powdered particles of the compound, such as sulphides or selenides, which is to be employed as the electrode material. Such fused material may be readily cast into electrode disks and worked substantially as any other cast metal, and when finished, have relatively great mechanical strength. Electronegative electrode elements, when assembled in couples with a suitable electropositive electrode element and arranged as a rectifying unit, as shown in Fig. 1, may be placed under substantially any degree of mechanical pressure which is desired without injuring it in any way. The pressure in consequence need be limited only by mechanical considerations of the design employed. In the case illustrated, the limiting pressure is that which would strip the threads from the assembly bolt.

When electronegative electrode elements are made of the materials here indicated, it is well known that they have a negative temperature-resistance coefficient. Consequently, in order that the losses in the electrode elements at other than the contacting surface shall be low, it is preferable to maintain the electrode elements at a relatively high operating temperature. The rectifying unit, in consequence, should be designed to conserve the heat generated while passing current and to this end preferably has heat insulation. It is desirable also to provide some means for initiating or increasing the heating of the unit independently of the heat normally generated by the passage of current. In the drawing, this is shown as accomplished by providing an electric heater 20 encased in the insulating material 21, which is shown as surrounding both the rectifying unit and the heater 20. The heating means thus provided, it will be noted, is not only independent of the heat normally generated by the unit, but the heater itself is external thereto, although structurally associated with it. Independent means to this end may be further provided, which are interiorly disposed with respect to the rectifying unit, for example, by inserting a thin layer of relatively conducting non-film-forming material, such as graphite, between the electropositive and electronegative electrode elements. Another way by which internal heating means may be provided is to compound with the magnesium anode a non-film-forming conducting material, such as cadmium; this increases the leakage area between the electrode elements, and in consequence increases the resistance losses.

Another method other than coating the respective electrode elements, which is adapted to increase the leakage, may be practiced as follows; the electronegative electrode element, when made from powdered material to be fused, is provided with a component which is mixed initially with the powdered material in amounts adapted to increase the leakage in the desired degree. For this purpose, graphite is a suitable component.

In operation, it is seen that the rectifying unit here provided functions to pass direct current when the electropositive electrode element is negatively charged, and the electronegative electrode element positively charged. Also it will be seen that the resistance at the contacting surface between the electropositive and electronegative electrode elements insures a relatively high production of heat energy at the contacting surface. In consequence, a vigorous electro-chemical reaction is maintained for the production of the current-blocking film. Since the heat of the rectifying unit is conserved, the operating temperature will be high. Consequently, the resistance of the electrode elements is lowered, which insures that the resistance of the current-blocking film will be lowered, so that the specific resistances of the film and of the electronegative electrode element have approached the same value, and consequently, have relatively high current conductivity during normal operation. This latter insures relatively high operating efficiency in this character of device.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In electric current rectifiers and the like, of the dry surface contact variety, an asymmetric couple arranged to have substantially uniform unilateral conductivity for relatively long periods of time, which comprises electropositive and electronegative electrode elements relatively widely divergent in the electrochemical series, said electronegative electrode element being a metallic compound of the oxygen family in the sixth periodic group having relatively high specific conductivity and provided with a crystalline surface coating of another compound of said sixth periodic group having relatively low specific conductivity.

2. In electric current rectifiers and the like of the dry surface contact variety, an asymmetric couple arranged to have substantially uniform unilateral conductivity for relatively long periods of time, which comprises electropositive and electronegative electrode elements, relatively widely divergent in the electrochemical series, said electronegative electrode element being a metallic compound of the oxygen family in the sixth periodic group having relatively high specific conductivity and provided with a surface coating of an oxide material adapted to impart a high surface-contact-resistance characteristic to said couple.

3. In electric current rectifiers and the like, of the dry surface contact variety, an asymmetric couple arranged to have substantially uniform unilateral conductivity for relatively long periods of time, which comprises electropositive and electronegative electrode elements, relatively widely divergent in the electrochemical series, said electronegative electrode element being a metallic compound of the oxygen family in the sixth periodic group having relatively high specific conductivity and provided with a surface coating of oxide of the material of said electronegative electrode element adapted to impart a high surface contact rectifying characteristic to said couple.

4. In electric current rectifiers and the like, of the dry surface contact variety, an asymmetric couple arranged to have substantially uniform unilateral conductivity for relatively long periods of time, which comprises electropositive and electronegative electrode elements respectively of a relatively light metal of the second and third periodic groups and of a metallic compound of the oxygen family in the sixth periodic group having relatively high specific conductivity and provided with a surface coating of another compound of said oxygen family in the sixth periodic group having relatively low specific conductivity.

5. In electric current rectifiers and the like, of the dry surface contact variety, an asymmetric couple arranged to have substantially uniform unilateral conductivity for relatively long periods of time, which comprises electropositive and electronegative electrode elements respectively of a relatively light metal of the second and third periodic groups and of a metallic compound of the oxygen family in the sixth periodic group, said electronegative electrode element having relatively high specific conductivity and provided with a surface coating of an oxide material adapted to impart a high surface contact resistance characteristic to said couple.

6. In electric current rectifiers and the like, of the dry surface contact variety, an asymmetric couple arranged to have substantially uniform unilateral conductivity for relatively long periods of time, which comprises electropositive and electronegative electrode elements, respectively, of a relatively light metal of the second and third periodic groups and of a metallic compound of the oxygen family in the sixth periodic group, said electronegative electrode element having relatively high specific conductivity and provided with a surface coating of oxide of the material of said electronegative electrode element adapted to impart a high surface contact rectifying characteristic to said couple.

7. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of a compound of the oxygen family in the sixth periodic group having a base of copper, said electronegative electrode element having relatively high specific conductivity and provided with a surface coating of another compound of said sixth periodic group having relatively low specific conductivity.

8. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of a fused compound of the oxygen family in the sixth periodic group having a base of copper, said electronegative electrode element having relatively high specific conductivity and provided with a surface coating of oxide of the material of said electronegative electrode element adapted to impart a high surface contact rectifying characteristic to said couple.

9. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of homogeneous cast cupric selenide, said electronegative electrode element having relatively high specific conductivity and provided with a surface coating of another compound of the oxygen family in the sixth periodic group having relatively low specific conductivity.

10. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of homogeneous cast cupric selenide, said electronegative electrode element having relatively high specific conductivity and provided with a surface coating of an oxide of the material of said electronegative electrode element adapted to impart a high surface contact rectifying characteristic to said couple.

11. In electric current rectifiers and the like, of the dry surface contact variety, an asymmetric couple arranged to have substantially uniform unilateral conductivity for relatively long periods of time, which comprises electropositive and electronegative electrode elements relatively widely divergent in the electrochemical series, said electronegative electrode element being a metallic compound of the oxygen family in the sixth periodic group and provided with a surface layer of material adapted to impart a high surface contact-resistance-characteristic to said couple, and an independent external electric heating means disposed adjacently of said couple.

12. In electric current rectifiers and the like, of the dry surface contact variety, an asymmetric couple arranged to have substantially uniform unilateral conductivity for relatively long periods of time, which comprises electropositive and electronegative electrode elements respectively, of magnesium and of a compound of the oxygen family in the sixth periodic group having a base of copper, said electronegative electrode being provided with a surface layer of material having a higher specific resistance than that of said electrode element, and means associated with said couple for independently heating the same.

13. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of a compound of the oxygen family in the sixth periodic group having a base of copper, said electronegative electrode element having relatively high specific conductivity and provided with a surface coating of another compound of said oxygen family in the sixth periodic group having relatively low specific conductivity, an electric heating means associated with said couple for independently heating the same, and a heat conserving envelope arranged to enshroud both said couple and said heating means.

14. In electric current rectifiers and the like, of the dry surface contact variety, an asymmetric couple arranged to have substantially uniform unilateral conductivity for relatively long periods of time, which comprises electropositive and electronegative electrode elements respectively of magnesium and of a fused compound of the oxygen family in the sixth periodic group having a base of copper, said electronegative electrode element having relatively high specific conductivity and provided with a surface coating of oxide of the material of said electronegative electrode element adapted to impart a high surface contact rectifying characteristic to said couple, and external and internal independent electric heating means operatively associated with said couple.

In testimony whereof I affix my signature.

SAMUEL RUBEN.